Jan. 18, 1955

R. G. HARTUNG 2,699,964

VEHICLE GRILL GUARD

Filed July 6, 1953

INVENTOR.
ROBERT G. HARTUNG
BY Fulwider, Mattingly
and Babcock
ATTORNEYS.

United States Patent Office 2,699,964
Patented Jan. 18, 1955

2,699,964

VEHICLE GRILL GUARD

Robert G. Hartung, Long Beach, Calif.

Application July 6, 1953, Serial No. 366,367

4 Claims. (Cl. 293—60)

The present invention relates generally to motor vehicles, and more particularly to a new and improved grill guard adapted to be mounted on the front of a motor vehicle.

There are presently being marketed several types of vehicles, such as trucks and buses, having engine hoods that are pivoted at their rear portion whereby their front portion can be lifted so as to provide access to the vehicle's engine. Although many of the owners of such vehicles desire to provide them with protective steel grill guards this has not previously been possible because the rear of the conventional grill guard must be positioned so closely adjacent the front of the hood that the vertical lifting thereof cannot take place. The grill guard of the present invention was developed to overcome this disadvantage and hence enable vehicles having a hood of this nature to be equipped with a protective grill guard.

It is a major object of the present invention to provide a novel grill guard for use with a vehicle having an engine hood that is pivoted at its rear portion whereby its front portion may be lifted vertically for access to the engine.

It is another object of the invention to provide a grill guard of this nature which has the general appearance of a conventional grill guard.

A further object of the present invention is to provide a grill guard of this nature which is fool-proof in operation and requires no special tools in order to be operated.

Another object of the invention is to provide a grill guard of the aforedescribed nature which is simple in design and rugged of construction whereby it may have a long service life.

Yet a further object of the present invention is to provide a grill guard of the aforedescribed nature which may be manufactured at but a slightly higher cost than a conventional grill guard.

An additional object of the invention is to provide a grill guard of the aforedescribed nature which affords as much protection to the front of the vehicle as a conventional grill guard.

These and other objects of the present invention will become apparent from the following detailed description of a preferred embodiment thereof, when taken in conjunction with appended drawings wherein.

Figure 1:
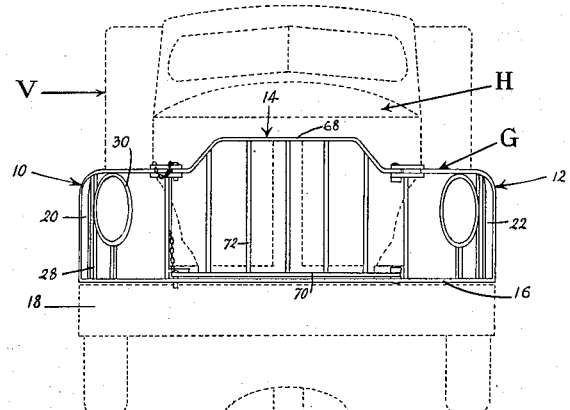
Figure 1 is a front elevational view showing a preferred form of grill guard embodying the present invention mounted on the front of a vehicle.
Figure 2:
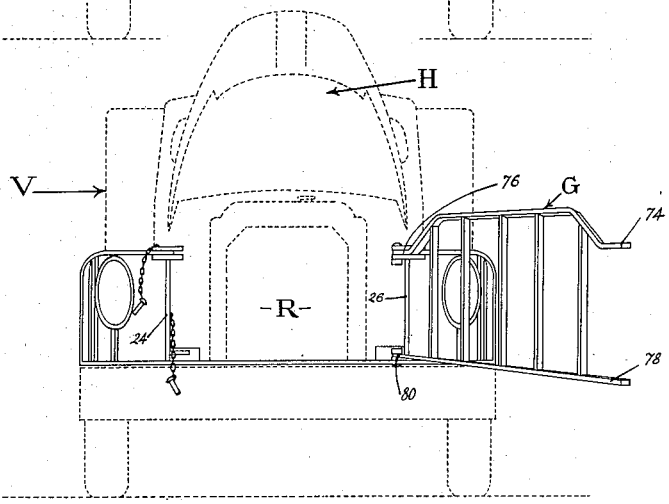
Figure 2 is a view similar to Figure 1 but showing the hood of the vehicle in a raised position, and showing the grill guard in an open position.

Referring to the drawings, the preferred form of grill guard G embodying the present invention is shown mounted at the front of a motor vehicle V having a hood H which is pivoted at its rear portion whereby its front portion may be lifted vertically for access to the engine (not shown) of the vehicle. The grill guard G broadly comprises a pair of side members, generally designated 10 and 12, and a center member, generally designated 14, that is interposed between the side members. As shown in Figure 1, the center member 14 is normally in alignment with the side members 10 and 12 whereby it serves to protect the hood H. When, however, the hood H is raised as shown in Figure 2, the center portion 14 of the grill guard may be pivoted forwardly in a generally horizontal path so as to permit the front of the hood H to be raised and lowered vertically.

More particularly, the grill guard G will be fabricated from a plurality of elongated steel elements or rods which are preferably welded together so as to provide a rigid integral structure. Each of the side members 10 and 12 are rigidly connected by a horizontally extending base element 16, the underside of which is adapted to be rigidly bolted or otherwise secured to the top of the bumper 18 of the vehicle V. The outermost side and the upper edge of each of the side members 10 and 12 will preferably be formed from a single piece of steel, designated 20 and 22, respectively. The inner portion of each of the side members 10 and 12 includes a vertical post designated 24 and 26, respectively. A number of vertically extending bars 28 are positioned between the base member 16 and the elements 20 and 22. A generally circular steel ring 30 is secured in each of the side members so as to be aligned with the headlights of the vehicle V.

At the upper end of the post 24 of side member 10 a pair of steel lugs 32 formed with vertically extending aligned bores 34 are rigidly mounted. These lugs define a pocket 35. The lower portion of the post 24 is rigidly secured to a horizontally extending ear 36 which cooperates with the base member 16 and a vertically extending plate 38 to define a pocket 40. The lug 36 and the base member 16 are formed with aligned vertically extending bores 42. Lock pins 44 are secured to the upper and lower portions of the side members adjacent the post 24 by means of chains 46. These pins 44 are adapted to be removably received within bores 34 and 42.

Figure 5:
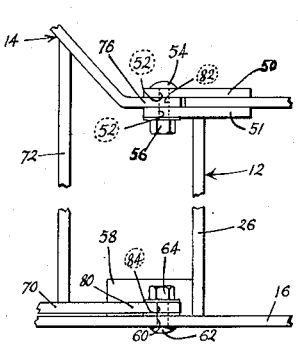

With reference to Figure 5, a pair of horizontal lugs 50 and 51 are rigidly mounted at the upper end of the vertical post 26 of side member 12. These lugs are formed with vertically extending aligned bores 52. A pivot pin 54 secured by a nut 56 is shown disposed within the bores 52. Adjacent the lower end of the post 26 is rigidly mounted a vertical plate 58. The base member 16 is formed with a vertically extending bore 60 adapted to receive a pivot pin 62 which is secured by a nut 64.

The center grill member 14 includes an upper support element 68 and a lower support element 70 between which are disposed a plurality of vertically extending bars 72; the upper and lower ends of these bars being rigidly secured between the support elements. The outermost ends of the upper support element 68 define a pair of tongues 74 and 76 respectively, while the outer ends of the lower support element 70 define a pair of tongues 78 and 80. As shown in Figure 5, the tongues 76 and 80 are formed with bores 82 and 84, respectively, adapted to receive the pivot bolts 54 and 62, respectively. With this arrangement, the center portion of the grill may be pivoted in a horizontal path about the vertical axis of these pivot bolts. The tongues 74 and 78 of the center member 14 are adapted to be received by the pockets 35 and 40, respectively. The tongues 74 and 78 are formed with vertical bores 88 and 90 whereby they may receive the lock pins 44. With this construction, when the lock pins 44 are inserted through the bores 88 and 90 the center member 14 will be rigidly held in place.

Figure 3:
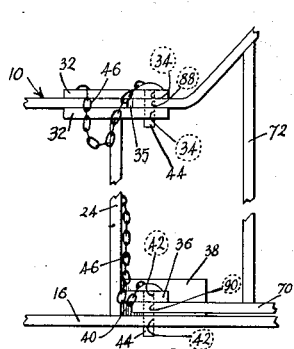
Figures 3 to 5 are enlarged fragmentary front elevational views showing certain details of construction of the grill guard disclosed in Figures 1 and 2.
Figure 4:
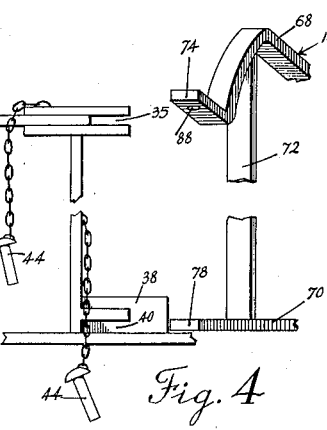

In operation, the lock pins 44 will normally be positioned as indicated in Figures 1 and 3. When, however, it is desired to raise the hood H of the vehicle V from its normal position of Figure 1 to its raised position of Figure 2, the lock pins 44 will be urged upwardly, as by means of a hammer. Thereafter, the tongues 74 and 78 of the center grill member 14 will be free to move out of the pockets 35 and 40 whereby the center member may be pivoted forwardly in a horizontal path to its open position of Figure 2. Ready access may then be had to the engine of the vehicle V as well as to the radiator R thereof. The chains 46 prevent loss of the lock pins 44 at this time.

While there has been shown and described herein what is presently considered to be preferred embodiment of the present invention, it will be apparent that various changes and modifications may be made thereto without departing from the spirit of the invention or the scope of the following claims.

I claim:

1. A grill guard for use with a vehicle having an engine hood that is pivoted at its rear portion whereby its front portion may be lifted vertically for access to said engine, comprising: a pair of side members adapted to be rigidly secured to the front of said vehicle at either side of said hood; a center member interposed between said side members; pivot means securing one side of said center member to the inner portion of one of said side members; a vertically extending bore formed in the inner portion of the other of said side members; a vertically extending bore formed in the inner portion of the opposite side of said center member, said bores being in vertical alignment when said center member is in its normal position between said side members; and, a lock pin removably disposable within said bores whereby said center member may be pivoted forwardly from its normal position in a horizontal path so as to permit vertical movement of said hood.

2. A grill guard for use with a vehicle having an engine hood that is pivoted at its rear portion whereby its front portion may be lifted vertically for access to said engine, comprising: a pair of side members adapted to be rigidly secured to the front of said vehicle at either side of said hood; a center member interposed between said side members and pivotally secured at one side to the inner portion of one of said side members; pocket means formed at the inner portion of the other of said side members; horizontally extending tongue means formed on said center member adapted to be disposed within said pocket means when said center member is disposed in its normal closed position; vertically extending bores formed in said other side member and said tongue means and adapted to be in vertical alignment when said center member is in its normal position; and, a lock pin removably disposable within said bores whereby said center member may be pivoted forwardly from its normal position in a horizontal path so as to permit vertical movement of said hood.

3. A grill guard for use with a vehicle having an engine hood that is pivoted at its rear portion whereby its front portion may be lifted vertically for access to said engine, comprising: a horizontally extending base element adapted to be rigidly secured to the bumper of said vehicle; a pair of side grill members secured to said base element at either side of said hood; a center grill member interposed between the inner portions of said side grill members, one side of said center member being pivotally secured to the inner portion of one of said side grill members whereby said center portion may be pivoted forwardly in a horizontal path from its normal position to an open position; a pocket formed at the upper and lower ends of the inner portion of the other of said side grill members; a pair of horizontally extending tongues formed at the upper and lower ends of the free end of said center grill member; vertically extending bores formed at the inner portion of said other side member and said tongue and adapted to be in vertical alignment when said center member is in its normal position; a pair of lock pins removably disposable within said bores for retaining said center member in its normal position; and, a chain securing each of said pins to said other side member.

4. A grill guard for use with a vehicle having an engine hood that is pivoted at its rear portion whereby its front portion may be lifted vertically for access to said engine, comprising: a pair of side members adapted to be rigidly secured to the front of said vehicle at either side of said hood; a center member interposed between said side members; pivot means securing one side of said center member to the inner portion of one of said members; a first vertically extending surface formed on the inner portion of the other of said side members; a second vertically extending surface formed on the inner portion of the opposite side of said center member, said vertical surfaces being in vertical alignment when said center member is in its normal position between said side members; and, a lock means formed with a third vertically extending surface that is engagable with said first and second vertically extending surfaces so as to secure the opposite side of said center member to the inner portion of the other of said side members, said center member being pivotable forwardly from its normal position in a horizontal path so as to permit vertical movement of said hood when said third vertically extending surface is disengaged from said first and second vertically extending surfaces.

References Cited in the file of this patent

UNITED STATES PATENTS

| | | |
|---|---|---|
| 1,683,283 | Bowman | Sept. 4, 1928 |
| 1,779,661 | Cleland | Oct. 28, 1930 |
| 2,184,597 | Inglehart | Dec. 26, 1939 |
| 2,396,652 | Heilman | Mar. 19, 1946 |
| 2,569,218 | Bailey, Jr. | Sept. 25, 1951 |
| 2,572,477 | Harden | Oct. 23, 1951 |